April 13, 1954   J. N. PAQUIN   2,675,250
QUICK-DISCONNECT VALVED COUPLING
Filed April 29, 1949   2 Sheets-Sheet 1
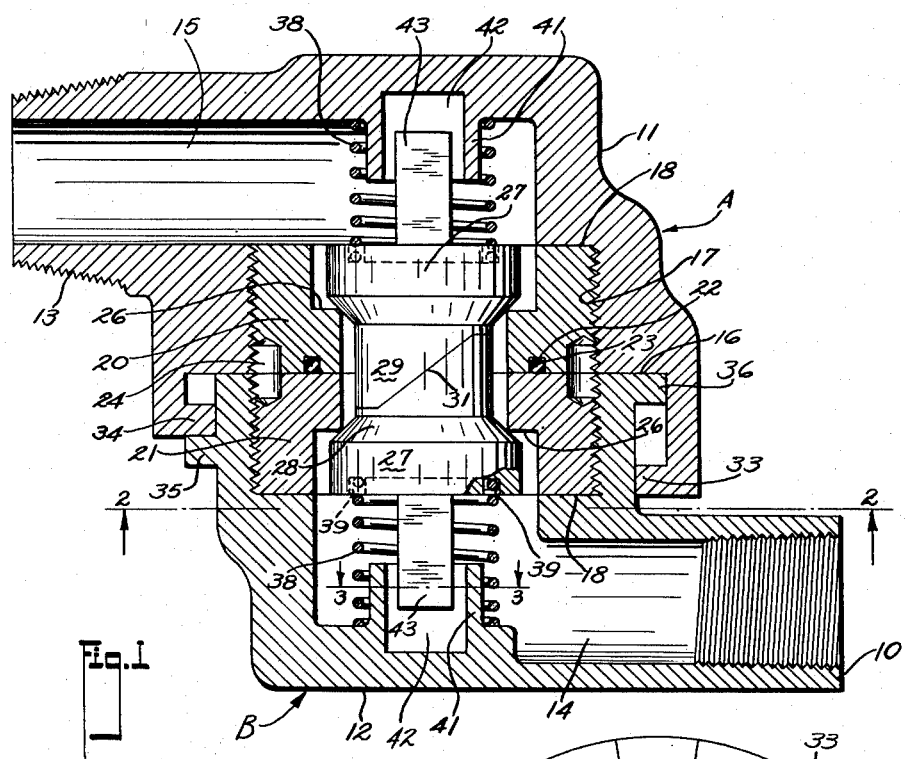
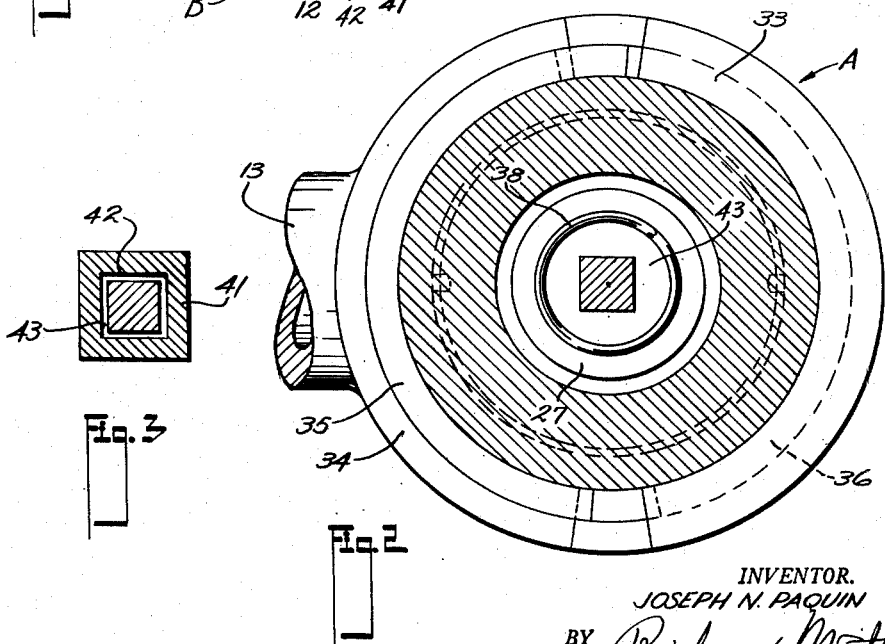
INVENTOR.
JOSEPH N. PAQUIN
BY Richey & Watts
ATTORNEYS April 13, 1954  J. N. PAQUIN  2,675,250
QUICK-DISCONNECT VALVED COUPLING
Filed April 29, 1949                                            2 Sheets-Sheet 2

INVENTOR.
JOSEPH N. PAQUIN
BY Richey & Watts
ATTORNEYS

Patented Apr. 13, 1954

2,675,250

UNITED STATES PATENT OFFICE 2,675,250

QUICK-DISCONNECT VALVED COUPLING

Joseph Norman Paquin, Cleveland, Ohio, assignor to The Weatherhead Company, Cleveland, Ohio, a corporation of Ohio Application April 29, 1949, Serial No. 90,519

5 Claims. (Cl. 284—10)

This invention relates to a quick-disconnect valved coupling for high pressure fluid lines. The invention is directed to an improved coupling which automatically operates to close the fluid outlets of the two parts of the coupling when they are separated and to open the fluid passage through the coupling automatically upon the proper engagement of the two parts.

An object of the invention is to improve couplings of the quick-disconnect type; that is, those which are adapted to be speedily connected and disconnected without the use of wrenches or other tools. A further object of the invention is to provide an improved quick-disconnect coupling in which the parts of the coupling act automatically to open and close the fluid conduits therethrough as the parts of the coupling are connected and disconnected. A still further object is to insure that the parts of the coupling are safely interlocked before the valves are open to permit flow of fluid.

The principles of the invention, the manner in which the stated objects are realized, and various additional advantages of the invention, will be clear to those skilled in the art from the description herein of the presently preferred embodiment of the invention and the accompanying drawings in which:

Fig. 1 is a longitudinal sectional view of a coupling at the start of the coupling process;

Fig. 2 is a sectional view of the same on the plane indicated in Fig. 1;

Fig. 3 is a detail sectional view on the plane indicated in Fig. 3;

Figure 4:
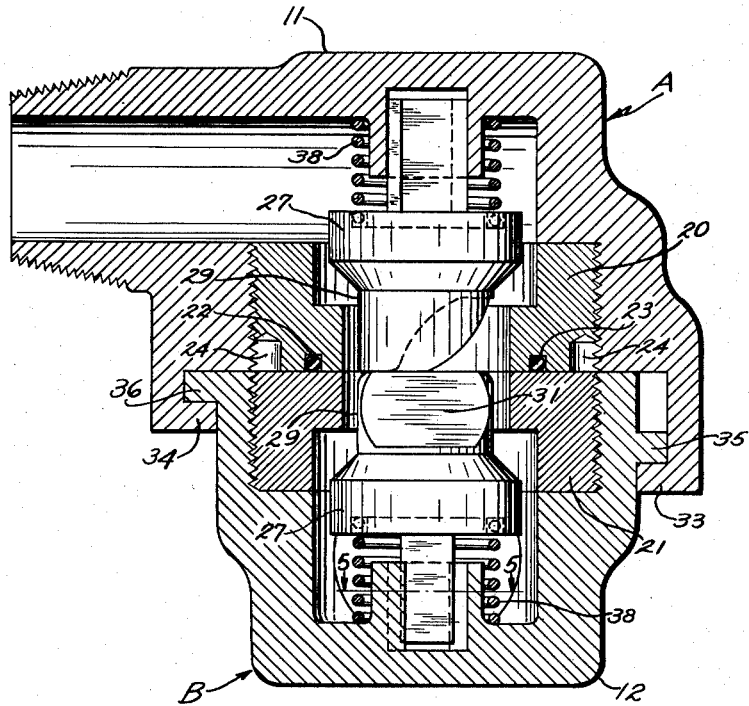
Fig. 4 is a longitudinal section with the coupling in engaged position.

Referring to Fig. 1, the quick-disconnect coupling comprises two parts or halves A and B which are generally similar and may be identical except as hereinafter pointed out, each of which is adapted to be more or less permanently attached to a fitting, which may be fixed or may be on the end of a flexible conduit such as a hose. The two parts A and B include check valves which prevent flow of fluid from the ends of the hoses when the parts are uncoupled. Coupling the two parts of the device opens the valves so that free flow through the coupling from either hose to the other is permitted. The coupling is preferably accomplished by a type of bayonet joint.

The two parts A and B comprise bodies or casings 11 and 12, respectively, which may be sand castings or die castings, or may be formed in any suitable manner. The body 11 is provided with a threaded inlet connection boss 13 through which an inlet passage 15 passes into the body 11 and the body 12 likewise with a threaded boss 10 communicating with the interior of the body through a passage 14. As illustrated, the boss 13 is provided with external taper threads and the boss 10 with internal straight threads, but of course these fittings may be adapted in any convenient manner to the attachment of hoses or other fittings. The bodies 11 and 12 are formed with plane mating surfaces 16, and each is centrally bored and tapped to form internal threads 17 and a shoulder 18 for the reception of valve seat bushings 20 and 21, the outer faces of which lie in the plane of the surfaces 16 when the valve seats are lodged against the shoulders 18. The two valve seat inserts are alike except that the insert 20 is provided with a circular groove 22 in the face thereof to receive an O-ring 23 which is provided to seal against leakage of fluid radially outward between the bushings 20 and 21. These bushings may be provided with recesses 24 for a spanner wrench. Each of the sleeves 20 and 21 is formed with a shoulder 26 which provides the seat for a check valve poppet indicated generally as 27, the two poppets preferably being identical. Each poppet 27 comprises a body formed with a conical face 28, for engagement with the seat 26, and a cylindrical extension 29. The extensions 29 are faced off so that the major part of the end surface is inclined generally as indicated at 31 in Fig. 1, although the degree of inclination of the surface is not critical. The two inclined surfaces or ramps 31 are complementary, and when the two parts of the coupling are opposed face to face prior to coupling as illustrated in Fig. 1, the two surfaces 31 are in contact, or substantially so, but of course not so as to lift the poppets 27 from the seats 26.

A desirable feature of the invention is that the two halves of the coupling rotate from 120 to 180° for full interlock and opening of the valves. The embodiment illustrated herein is provided with a bayonet lock for full 180° rotation of the mating parts. As will be apparent from the figures, the body A is provided with an extension of the outer shell beyond the surface 16 on which are formed two substantially semi-circular inwardly directed flanges 33 and 34. The coupling member B is provided with outwardly extending flanges 35 and 36 adapted to engage the flanges 33 and 34, respectively, of the coupling half A. As will be apparent, the space between the flange 34 and the surface 16 is sufficient to receive the flange 36. The space between the flange 35 and surface 16 is sufficient to provide clearance for the flange 35 beyond the flange 34 and the flange 33 is disposed far enough from the face plane 16 to receive the undersurface of the flange 35. These flanges extend substantially 180° around the periphery of the sections as indicated most clearly in Fig. 2. Fig 1 illustrates the parts of the bayonet lock with the coupling section B inserted into the coupling section A but before rotation to cause engagement of the bayonet joint. Fig. 4 shows the bottom of the section B rotated approximately 120° from its position in Fig. 1 and illustrates the locking engagement of the flanges, with the faces 16 in forced contact.

The poppets 27 are ordinarily held against their seats by coil compression springs 38 received in recesses 39 in the poppets 27 and located on the body by being fitted over rectangular bosses 41 projecting into the internal cavity of the bosses. The bosses 41 are formed with rectangular sockets 42 which receive the ends of rectangular stems 43 of the poppets which are of somewhat smaller dimensions than the openings 42. The rectangular socket 42 and the rectangular stem 43 constitute a lost motion drive between the poppets 27 and the body members 11 and 12, the lost motion is provided since the corners of the stem 43 constitute abutments which engage portions of the walls of the socket 42. Since the arcuate extent of the corners of the stem 43 is less than the arcuate spacing of the portions of the walls of the socket 42 which are abutted by the corners of the stem 43 a limited relative motion between these two elements is provided.

Figure 5:
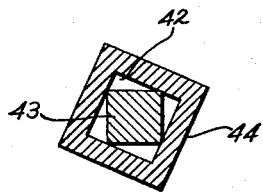
Fig. 5 is a detail sectional view taken on the plane indicated in Fig. 4.

The valves are opened by relative rotation of the halves A and B of the fitting causing relative rotation of the poppets, by which the two poppets are cammed apart by cooperation of the oblique surfaces 31. The relative rotation of the poppets is insured by the engagement of the squared stems 43 in the sockets 42, as will be apparent from Figs. 3 and 5. An important feature in this connection is that the stems 43 are smaller than the sockets therefor, so that considerable relative rotation of the halves of the coupling occurs before the stems 43 are engaged by the boss for rotation of the poppets as indicated in Fig. 5. This being the case, the flange 36 will be sufficiently engaged with the flange 34 and the flange 35 sufficiently with the flange 33 to resist the fluid pressure tending to force the couplings apart before the valves open to permit this force to be exercised. Preferably, the coupling turns at least 30° before the stems 43 are engaged, although further movement may be tolerated. As illustrated, both stems 43 are provided with clearance in the openings 42 but, as will be apparent, substantially the entire rotational clearance may be provided in either half of the body if desired. When the two halves of the body have been rotated sufficiently to start the relative rotation of the two poppets, they are cammed apart by the coaction of the inclined surfaces against the fluid pressure and the ordinarily much smaller compressive force of the springs. When the two poppets have turned approximately 90° with respect to each other as indicated in Fig. 4, the valves will be fully opened. However, the fittings may be rotated approximately 180° from the position illustrated in Fig. 1 to obtain full engagement of the bayonet joint.

The stems 43 should be of sufficient length with respect to the proportions of the body so that, as illustrated in Fig. 4, when the valves are opened, the stems approach the body so that each poppet serves as a positive stop to prevent flow of fluid through the fitting from closing the opposed poppet after the manner of a check valve. When the coupling is engaged as illustrated in Fig. 4, fluid pressure is, of course, present at the junction of the two fittings but escape of fluid is prevented by the O-ring 23.

When it is desired to disconnect the coupling it is only necessary to rotate the two fittings relative to each other in either direction to release the bayonet lock and permit the poppets to re-seat.

Figure 6:
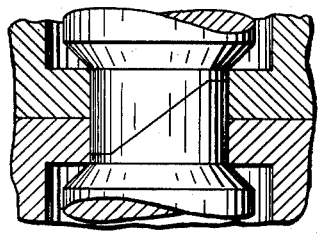
Fig. 6 is a partial sectional view illustrating a modification.

A modification of the structure as illustrated in Fig. 6 makes it possible to unite the two halves of the coupling without permitting the entrance of air into a hydraulic system. The detailed view of Fig. 6 has the same viewpoint as Fig. 1 and illustrates only those parts of the coupling which need be modified to exclude air. In the modified form the outer diameter of the camming extension 29a of the poppet body 27a and the internal diameter of the bores of the inserts 20a and 21a are substantially equal, there being just sufficient clearance for free sliding movement of the poppet. As will be apparent from the figure, there is no free space for air when the two halves of the coupling are opposed. Likewise, when the coupling is opened, there is no free space for fluid between the poppet extensions 29a and the bores in which they slide. This construction is advantageous for liquid systems, but the advantages of the construction as previously described may be realized without the inclusion of this additional feature.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A coupling for fluid lines comprising two body members formed with mating surfaces and aligned fluid passages terminating at said surfaces, means for locking the body members together by relative rotation about the axis of the passages, a valve poppet member reciprocable in each of said passages and normally engaging a seat therein, each poppet member including a camming portion located adjacent to said surface, the camming portions engaging when the body members are abutted and being formed to cam the poppet members apart and lift them from their seats upon relative rotation of said poppet members, resilient means tending to seat the poppets, and drive means between each body member and the associated poppet member limiting relative rotational movement therebetween, the drive means between one of said body members and its associated poppet member including a first abutment radially spaced from the axis of the passages on one of said members and two abutments on the associated member spaced from the axis of the passages a distance equal to said radial spacing of said first abutment, the arcuate spacing of said two abutments exceeding the arcuate extent of said first abutment, said abutments being arranged so that said first abutment is spaced from said two abutments until said body members are locked together by said locking means.

2. A coupling for fluid lines comprising two body members formed with mating surfaces and aligned fluid passages terminating at the said surface, means for locking the body members together by relative rotation about the axis of the passages, a valve poppet member reciprocable in each of said passages and normally engaging a seat therein, each poppet member including a camming portion located adjacent to said surface, the camming portions engaging when the parts are abutted and being formed to cam the poppet members apart and lift them from their seats upon relative rotation of said body members, resilient means tending to seat the poppet members, and drive means between said body members and the associated poppet members, said drive means including a first abutment spaced from the axis of the passages on one member and a second abutment on the associated member spaced from the axis of the passages a distance equal to the radial spacing of said first abutment, said abutments normally spaced apart when said mating surfaces are engaged prior to the locking of said body members together.

3. A coupling for fluid lines comprising two body members formed with mating surfaces and aligned fluid passages terminating at said surfaces, means for locking the parts together by relative rotation about the axis of the passages, a valve poppet member reciprocable in each of said passages and normally engaging a seat therein, each poppet member including a camming portion located adjacent the said surface, the camming portions engaging when the body members are abutted and being formed to cam the poppet members apart and lift them from their seats upon relative rotation of said body members, resilient means tending to seat the poppets, and lost motion drive means limiting relative rotational movement between the body members and the associated poppet members, after said body members are locked together by said locking means.

4. A coupling for fluid lines comprising two body members formed with mating surfaces and aligned fluid passages terminating at the said surfaces, means for locking the body members together by relative rotation about the axis of the passages, a valve poppet reciprocable in each of the said passages and normally engaging a seat therein, each poppet including a camming portion located adjacent the said surface, the camming portions engaging when the body members are abutted and being formed to cam the poppets apart and lift them from their seats upon relative rotation of said body members, resilient means tending to seat the poppets, and means for coupling the poppets to the body members for rotation comprising a non-circular stem on the poppet and a non-circular socket in the body member, the walls of said stem provide a first abutment radially spaced from the axis of said passages and the walls of said socket provide spaced abutments spaced from the axis of the passages a distance equal to said radial spacing of said first abutment, the arcuate spacing of said spaced abutments exceeding the arcuate extent of said first abutment, said first abutment being spaced from both of said spaced abutments until said body members are locked together by said locking means.

5. A coupling for fluid lines comprising two body members formed with mating surfaces and aligned fluid passages terminating at the said surfaces, means for locking the body members together by relative rotation about the axis of the passages, a valve poppet member reciprocable in each of the said passages and normally engaging a seat therein, each poppet member including a camming portion located adjacent the said surface, the camming portions engaging when the body members are abutted and being formed to cam the poppet members apart and lift them from their seat upon relative rotation of said body members, resilient means tending to seat the poppet and driving means between each body member and the associated poppet member, said driving means including a first abutment radially spaced from the axis of the passages on one member and two abutments on the associated member spaced from the axis of the passages a distance equal to said radial spacing of said first abutment, the arcuate spacing of said two abutments exceeding the arcuate extent of said first abutment thereby providing limited rotational motion between each body member and its associated poppet member, said first abutment being spaced from both of said two abutments until said body members are locked together by said locking means.

References Cited in the file of this patent

UNITED STATES PATENTS

| Number | Name | Date |
|---|---|---|
| 884,648 | Elgen | Apr. 14, 1908 |
| 1,815,501 | Francis et al. | July 21, 1931 |
| 2,393,489 | Trautman | Jan. 22, 1946 |
| 2,543,589 | Newcomb | Feb. 27, 1951 |

FOREIGN PATENTS

| Number | Country | Date |
|---|---|---|
| 170,959 | Germany | May 31, 1906 |
| 209,987 | Germany | May 17, 1909 |
| 329,688 | Germany | Dec. 3, 1920 |